United States Patent
Suzuki

(10) Patent No.: US 9,391,772 B2
(45) Date of Patent: Jul. 12, 2016

(54) KEY INFORMATION GENERATION DEVICE AND KEY INFORMATION GENERATION METHOD

(75) Inventor: Daisuke Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 235 days.

(21) Appl. No.: 14/115,251

(22) PCT Filed: Jun. 2, 2011

(86) PCT No.: PCT/JP2011/062702
§ 371 (c)(1),
(2), (4) Date: Nov. 1, 2013

(87) PCT Pub. No.: WO2012/164721
PCT Pub. Date: Dec. 6, 2012

(65) Prior Publication Data
US 2014/0089685 A1    Mar. 27, 2014

(51) Int. Cl.
*H04L 9/10*    (2006.01)
*H04L 9/08*    (2006.01)
(Continued)

(52) U.S. Cl.
CPC ............ *H04L 9/0866* (2013.01); *H04L 9/3278* (2013.01); *G06F 12/14* (2013.01); *G06F 21/50* (2013.01); *G06F 21/70* (2013.01); *G06F 2221/21* (2013.01); *G11B 20/00086* (2013.01)

(58) Field of Classification Search
CPC ......... G06F 21/70; G06F 21/10; G06F 21/50; G06F 2221/21; G06F 12/14; G06F 2207/7219; H04L 9/08; H04L 63/04; H04L 9/00; H04L 9/0866; H04L 9/3278; G11B 20/00086
See application file for complete search history.

(56) References Cited

U.S. PATENT DOCUMENTS 8,516,269 B1 * 8/2013 Hamlet ................... G06F 21/00
340/5.8
2005/0114653 A1 * 5/2005 Sudia .................. H04L 63/0823
713/158
(Continued)

FOREIGN PATENT DOCUMENTS

JP    2002 217889    8/2002
JP    2005 292902    10/2005
(Continued)

OTHER PUBLICATIONS

Extended European Search Report issued Apr. 29, 2015 in Patent Application No. 11866529.8.
(Continued)

*Primary Examiner* — Kaveh Abrishamkar
*Assistant Examiner* — Ayoub Alata
(74) *Attorney, Agent, or Firm* — Oblon, McClelland, Maier & Neustadt, L.L.P

(57) ABSTRACT

In initial generation (for example, shipping from the factory), a security device generates an identifier w specific to the security device, with the PUF technology, generates key information k (k=HF(k)) from the identifier w, generates encrypted confidential information x by encrypting (x=Enc (mk, k)) confidential information mk with the key information k, and stores the encrypted confidential information x and an authentication code h (h=HF'(k)) of the key information k, in a nonvolatile memory. In operation, the security device generates the identifier w with the PUF technology, generates the key information k from the identifier w, and decrypts the encrypted confidential information x with the key information k. At a timing where the identifier w is generated in the operation, the security device checks whether the current operating environment has largely changed from the initial generation (S311). If a change in operating environment is detected (S311→S312), the security device conducts a reset-up process (S312 to S315) of an authentication code h which is confidential information, and the encrypted confidential information x.

8 Claims, 5 Drawing Sheets

(51) Int. Cl.
*H04L 9/32* (2006.01)
*G06F 12/14* (2006.01)
*G11B 20/00* (2006.01)
*G06F 21/50* (2013.01)
*G06F 21/70* (2013.01)

(56) References Cited

U.S. PATENT DOCUMENTS

| | | |
|---|---|---|
| 2007/0250983 A1 | 11/2007 | Thompson et al. |
| 2009/0271860 A1 | 10/2009 | Nonaka et al. |
| 2010/0031065 A1 | 2/2010 | Futa et al. |
| 2010/0070777 A1 | 3/2010 | Salters et al. |
| 2010/0073147 A1 | 3/2010 | Guajardo Merchan et al. |
| 2010/0134848 A1* | 6/2010 | Lynggaard ............ G06F 3/0317 358/3.28 |
| 2010/0146261 A1 | 6/2010 | Talstra et al. |
| 2010/0250936 A1 | 9/2010 | Kusakawa et al. |
| 2012/0066515 A1 | 3/2012 | Kasuya |

FOREIGN PATENT DOCUMENTS

| | | |
|---|---|---|
| JP | 2009 524998 | 7/2009 |
| JP | 2009 533741 | 9/2009 |
| JP | 2010 511953 | 4/2010 |
| JP | 2010 226603 | 10/2010 |
| WO | 2008 056612 | 5/2008 |
| WO | 2010 134192 | 11/2010 |

OTHER PUBLICATIONS

Michael S. Kirkpatrick, et al., "Software Techniques to Combat Drift in PUF-based Authentication Systems" Workshop on Secure Component and System Identification, XP55183948, Jan. 1, 2010, 9 Pages.

International Search Report Issued Jul. 5, 2011 in PCT/JP11/062702 Filed Jun. 2, 2011.

* cited by examiner

KEY INFORMATION GENERATION DEVICE AND KEY INFORMATION GENERATION METHOD

TECHNICAL FIELD

The present invention relates to a security device (key information generation device) that executes an authentication process, encryption process, and the like. The present invention relates to a device and method for managing confidential information used in the encryption process, and an identifier specific to the device and needed to authenticate the device, stably and securely for a long period of time.

BACKGROUND ART

In recent years, along with the trend for networking built-in devices typically including mobile telephones, the necessity increases for the built-in devices to conduct a process concerning the information security in order to maintain the confidentiality and the integrity of data dealt with by the built-in devices and to authenticate the built-in devices themselves. The process concerning the information security is implemented by a cryptographic algorithm and authentication algorithm. Execution of such algorithms basically requires that each built-in device hold its unique confidential information and an identifier specific to the device "securely". "Securely" signifies that a person other than the authorized user of the built-in device cannot read or tamper the identifier easily.

A means for holding the identifier securely includes a protection method that uses a housing on which various types of sensors (a photosensor, a voltage sensor, and a frequency detector) are mounted to prevent an external unauthorized access using a physical protection film (a metal case or resin molding), and a protection method that uses an anti-tamper mechanism such as a security chip. These protection methods presume that they protect an identifier that exists in the device in a nonvolatile manner as digital data.

As a method that securely holds an identifier with an approach different from the above-mentioned means, a technology called PUF (Physical Unclonable Function) is available. The significant feature of the PUF resides in that the identifier is not held in the device as nonvolatile digital data. The PUF is practiced in several manners which are typically represented by "A signal generator based device security" disclosed in Patent Literature 1 and "A semiconductor device identifier generation method and semiconductor device" disclosed in Patent Literature 2.

The feature of an identifier generated by the PUF as in Patent Literature 1 or 2 resides in that a unique bit string is not always generated each time an identifier is generated. That is, the identifier is generated as data including noise. A technology described in Patent Literature 1, of converting an identifier including noise into unique data will be described hereinafter.

In Patent Literature 1, first, identifier generation is divided into two steps ("initial generation" and "re-generation"). A bit string generated in initial generation serves as the identifier of a device. In re-generation, a process of generating the same bit string as the bit string generated in initial generation is conducted.

<Initial Generation Step>

First, a bit string is generated by the PUF. As a simple example, 5-bit data is generated. The bit string will be defined as:
$w = (w1, w2, w3, w4, w5) = 10110$ Then, auxiliary data s of this bit string is calculated. Note that the calculation is conducted using a (5, 1, 5) repetition code.

In this case, the following 4-bit bit string is obtained:
$s = (w1 \text{ xor } w2, w1 \text{ xor } w3, w1 \text{ xor } w4, w1 \text{ xor } w5) = 1001$ The auxiliary data calculation method depends on the structure of an error correction code employed. The auxiliary data is data that may be disclosed and is stored in a nonvolatile area. That is, the nonvolatile area to store the auxiliary data need not be a secure environment.

<Re-Generation Step>

In the re-generation step, a bit string and auxiliary data are generated by the PUF in the same manner as in initial generation. This bit string will be defined as:
$w' = (w'1, w'2, w'3, w'4, w'5) = 10000$ In this example, data which is different by 2 bits from w generated in the initial generation step is outputted. This error in the bit string corresponds to the noise described above. Auxiliary data s' of w' is:
$s' = 1111$ Then, s calculated and stored in the initial generation step is read out, and
$e = s \text{ xor } s'$
is calculated.

Namely, $$\begin{aligned} e &= s \text{ xor } s' \\ &= 1001 \text{ xor } 1111 \\ &= 0110 \\ &= (e1, e2, e3, e4) \end{aligned}$$

Then, the error bit position of w' is specified by the following procedure.

Note that
$SUM(e1, e2, e3, e4) = e1+e2+e3+e4$,
$SL(e1, e2, e3, e4) = (e1 \text{ xor } e2, e1 \text{ xor } e3, e1 \text{ xor } e4, e1)$ <Step 1>
$SUM(e1, e2, e3, e4) = 2$
This indicates that the condition of being less than 3 is satisfied. Hence, w'1 is not wrong.

<Step 2>
$(e1, e2, e3, e4) <= SL(e1, e2, e3, e4) = 1100$
$SUM(e1, e2, e3, e4) = 2$
This indicates that the condition of being less than 3 is satisfied. Hence, w'2 is not wrong.

<Step 3>
$(e1, e2, e3, e4) <= SL(e1, e2, e3, e4) = 0111$
$SUM(e1, e2, e3, e4) = 3$
This indicates that the condition of being less than 3 is not satisfied. Hence, w'3 is wrong.

<Step 4>
$(e1, e2, e3, e4) <= SL(e1, e2, e3, e4) = 1110$
$SUM(e1, e2, e3, e4) = 3$
This indicates that the condition of being less than 3 is not satisfied. Hence, w'4 is wrong.

<Step 5>
$(e1, e2, e3, e4) <= SL(e1, e2, e3, e4) = 0011$
$SUM(e1, e2, e3, e4) = 2$
This indicates that the condition of being less than 3 is satisfied. Hence, w'5 is not wrong.

In accordance with the above checking result, w' is corrected. In this case, w' is corrected to 10110. This bit string is equal to w generated in initial generation.

In this manner, by conducting a process utilizing an error correction code, an identifier including noise can be converted into unique data.

If, in the above example, 3 bits are regenerated incorrectly, w cannot be correctly restored from w'. Namely, if noise exceeding the correction capability of a code that forms auxiliary data occurs in the regeneration step, an identifier cannot be generated correctly. For this reason, the error correction code used in the above process must have a correction capability determined by taking into account the error probability of the PUF.

The error probability of the PUF will be described. One major factor that increases the error probability of the PUF is a change in operating environment of the PUF with respect to the initial generation step as a criterion. A change in operating environment includes a temperature change, a voltage change, a deterioration over time of the semiconductor device, and the like.

In addition to a random factor that occurs momentarily, the change in operating environment includes chronological variations such as diurnal variations, seasonal variations, and deterioration over time.

CITATION LIST

Patent Literature

Patent Literature 1: JP 2009-524998
Patent Literature 2: JP 2009-533741

SUMMARY OF INVENTION

Technical Problem

If a code having a correction capability with a sufficiently large margin is to be employed taking into account the variations over time of the error probability of the PUF, then a complicated, large-scale circuit need be used. In particular, when equipment having a long service life such as an on-vehicle device, industrial equipment, or instrumentation equipment is involved, it is difficult to accurately estimate a correction capability margin.

It is an object of the present invention to provide a device that can manage confidential information stably and securely within a semiconductor device even if the code correction capability is low. It is also an object of the present invention to provide a device that can securely manage various types of confidential information assigned to the respective usages.

Solution to Problem

A key information generation device according to the present invention which generates key information includes:

an identifier generating part which, based on physical properties of the key information generation device, generates an identifier specific to the key information generation device;

a key information generating part which, based on the identifier generated by the identifier generating part, generates the key information to be used for encrypting and decrypting confidential information;

a cryptographic part which encrypts and decrypts the confidential information using the key information generated by the key information generating part; a hash part which generates a hash value in accordance with a predetermined hash value generating scheme that uses at least the key information generated by the key information generating part;

a storing part which stores encrypted confidential information and the hash value in a nonvolatile manner, the encrypted confidential information being formed by encrypting, with the cryptographic part, the confidential information using the key information generated by the key information generating part, the hash value being generated by the hash part in accordance with the hash value generating scheme that uses at least the key information used for encrypting the confidential information; and a comparing part, wherein the identifier generating part regenerates the identifier when the cryptographic part decrypts the encrypted confidential information, wherein the key information generating part regenerates the key information used by the cryptographic part, based on the identifier regenerated by the identifier generating part, for decrypting the encrypted confidential information, wherein the hash part regenerates the hash value in accordance with the hash value generating scheme that uses at least the key information regenerated by the key information generating part, wherein the comparing part compares the hash value regenerated by the hash part and the hash value stored in the storing part, and wherein the cryptographic part decrypts the encrypted confidential information, when the hash value regenerated by the hash part and the hash value stored in the storing part are equal according to comparison by the comparing part, using the key information regenerated by the key information generating part.

Advantageous Effects of Invention

According to the present invention, a device can be provided that can securely manage various types of confidential information assigned to the respective usages.

DESCRIPTION OF EMBODIMENTS

Embodiment 1

The meanings of symbols used in the following Embodiment 1 will be defined.

(1) Confidential Information mk;

The confidential information mk is a bit string that differs according to the device, or according to the shipping destination. The ultimate object of the security devices according to following Embodiments 1 and 2 is to manage the bit string stably and securely.

(2) Encrypting Function Enc, Decrypting Function Dec;

An encrypting function c=Enc(m, k) encrypts an input m using confidential information k. The encrypting function which outputs c is expressed as Enc.

A decrypting function m=Dec(c, k) decrypts an input c using the confidential information k.

(3) PUF-Generated Information w, s (s=syn(w));

Output information of the PUF will be expressed as w. Namely, "w" is an identifier which is specific to a security device 101 and generated by the PUF technology based on the physical properties of the security device 101. Auxiliary data corresponding to the identifier w will be expressed as s. An auxiliary data generating function will be expressed as syn. More specifically, generation of the auxiliary data s using the identifier w will be expressed as:

$$s=\mathrm{syn}(w)$$

(4) Error Correcting Process w=FEC(w', s);

Using output information w' of the PUF in the regeneration step and the auxiliary data s in the initial generation step, a process (error correcting process) of decoding w of the initial generation step will be expressed as:

$$w=FEC(w',s)$$

(5) Hash Function y=HF(x);

A process of obtaining a hash value y of "x" will be expressed as:

$$y=\mathrm{HF}(x)$$

(6) A process of obtaining the hash value y of "x" by a unidirectional hash function or a hash function different from (5) will be expressed as:

$$y=\mathrm{HF}'(x)$$

Embodiment 1 will be explained with reference to FIGS. 1 to 3.

Figure 1:
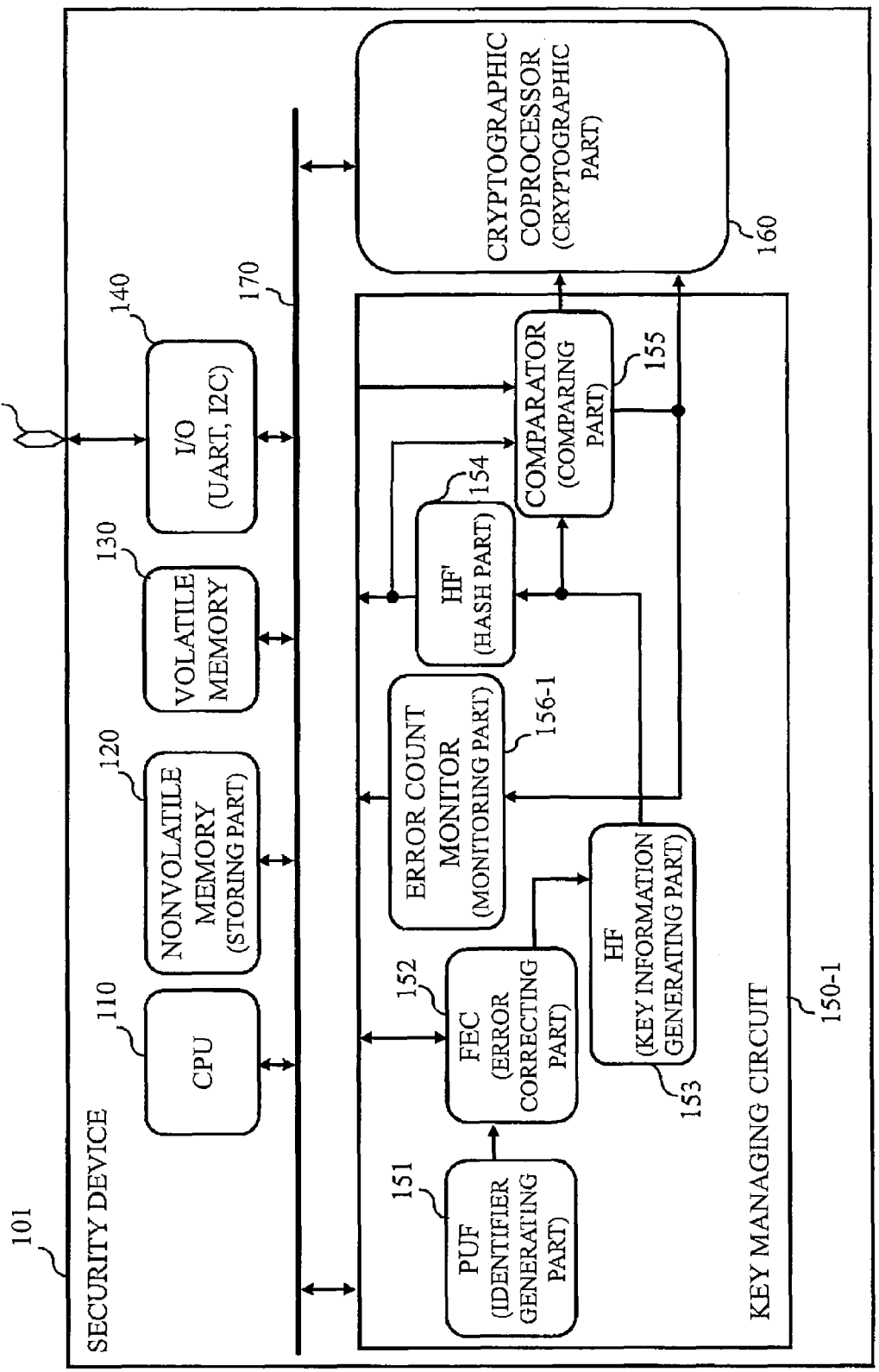
[FIG. 1] is a configuration diagram of a security device 101 according to Embodiment 1.

FIG. 1 is a block diagram of the security device 101 according to Embodiment 1. The security device 101 is aimed at managing the confidential information (confidential information mk to be described later) securely and stably.

(Configuration of Security Device 101)

The security device 101 (key information generating device) is provided with a CPU 110 which is a basic constituent element of a semiconductor device, a nonvolatile memory 120 (storing part) typically represented by an EEPROM or the like, a volatile memory 130 such as an SRAM, an I/O (140) which is an information input/output part, a key managing circuit 150-1, and a cryptographic coprocessor 160 (cryptographic part). The key managing circuit 150-1 has the main function of the security device 101. The cryptographic coprocessor 160 is a cryptographic coprocessor mounted in a typical security-purpose semiconductor device. As shown in FIG. 1, the above-enumerated devices ranging from the CPU 110 to the cryptographic coprocessor 160 are connected to a local bus 170. As the I/O (140), for example, a UART (Universal Asynchronous Receiver Transmitter) may be employed. The I/O (140) communicates externally via an external port 180.

(Configuration of Key Managing Circuit 150-1)

The key managing circuit 150-1 includes, as constituent elements, a PUF 151 (identifier generating part) which generates an identifier including noise, an FEC 152 (error correcting part) which corrects the noise by conducting a predetermined error correction process, a hash function HF 153 (key information generating part) which randomizes a corrected identifier, a unidirectional hash function HF' 154 (hash part) which generates an authentication code for the identifier, a comparator 155 (comparing part) which performs checking using the authentication code, and an error count monitor 156-1 (monitoring part) which receives the result of the comparator 155 and manages the count of cases where the comparison result indicates "not equal". The unidirectional hash function HF' 154 is an authentication code generating part. The authentication code originates from the identifier.

The operation of the security device 101 in FIG. 1 will be described.

Figure 2:
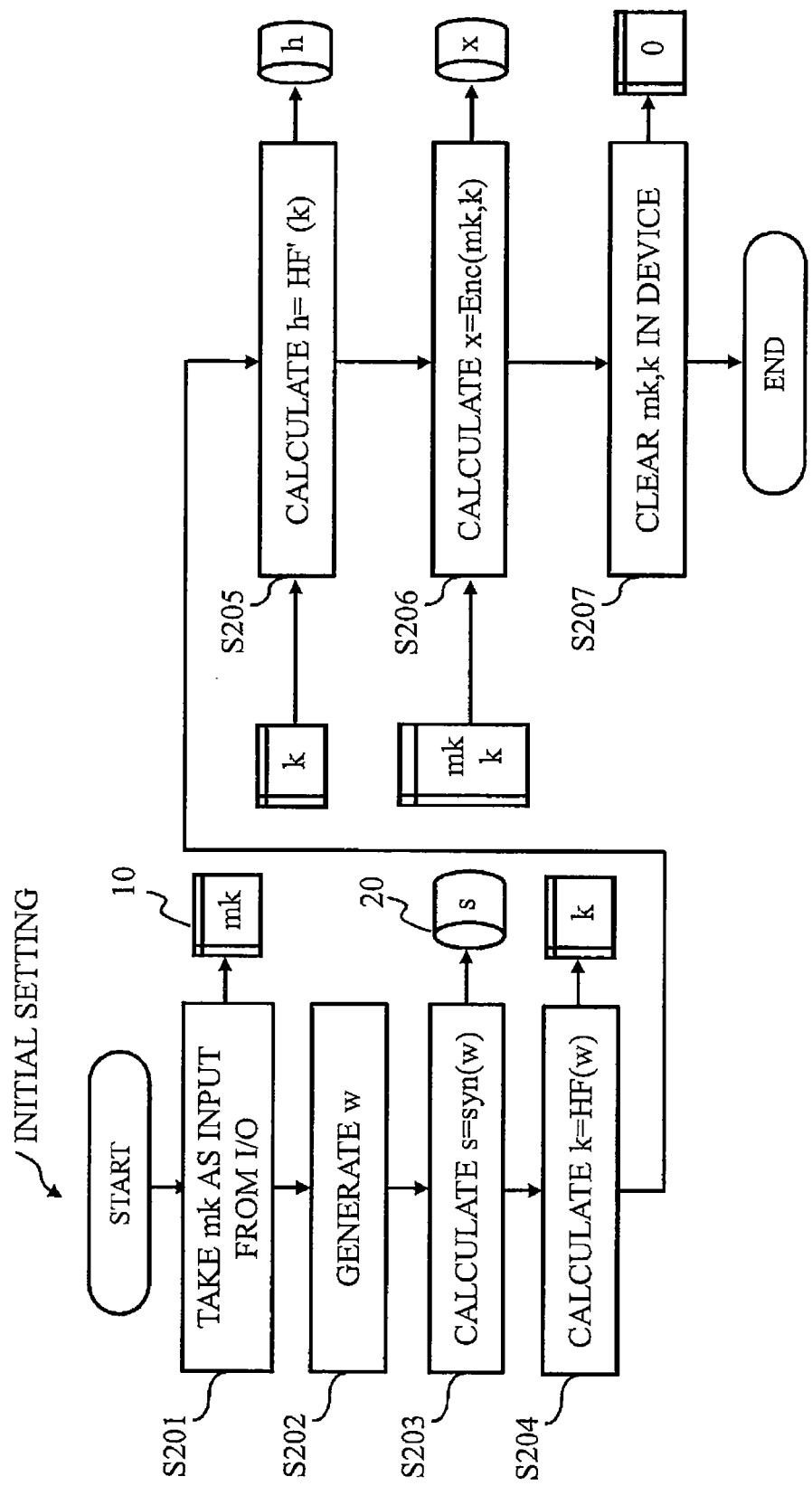
[FIG. 2] is a flowchart of initial setting of the security device 101 according to Embodiment 1.

FIG. 2 is a flowchart that explains the operation of the security device 101 in the initial setting. The initial setting will be explained with reference to FIG. 2. Referring to FIG. 2, a graphic form denoted by reference numeral 10 represents a volatile memory such as a register, and a graphic form denoted by reference numeral 20 represents a nonvolatile memory. The same applies to FIGS. 3 and 5 as well.

(1) First, the I/O (140) takes as input confidential information mk assigned to the devices, via the external port 180 (S201). This input activates the key managing circuit 150-1. First, the PUF 151 generates an identifier w based on the physical properties of the security device 101 (S202).

(2) Then, the FEC 152 generates auxiliary data s=syn(w) corresponding to the identifier w (S203). The auxiliary data s is outputted to the outside of the key managing circuit 150-1 and stored in the nonvolatile memory 120.

(3) Then, the hash function HF 153 randomizes the identifier w and outputs confidential information k (to be referred to as key information k as well) (S204). An authentication code h (hash value) of the confidential information k is calculated by the HF' 154 (S205). As with the auxiliary data s, the authentication code h is outputted to the outside of the key managing circuit 150-1 and stored in the nonvolatile memory 120.

(4) The cryptographic coprocessor 160 encrypts the confidential information mk inputted in S201, using the confidential information k as the key information, thus calculating x=Enc(mk, k) (S206). As with the auxiliary data s and the authentication code h, encrypted confidential information x is stored in the nonvolatile memory 120.

(5) After the above processes are completed, the confidential information mk and k existing in the key managing circuit 150-1, the register (volatile memory) of the cryptographic coprocessor 160, and the like are cleared (S207). Initial generation is thus completed.

Figure 3:
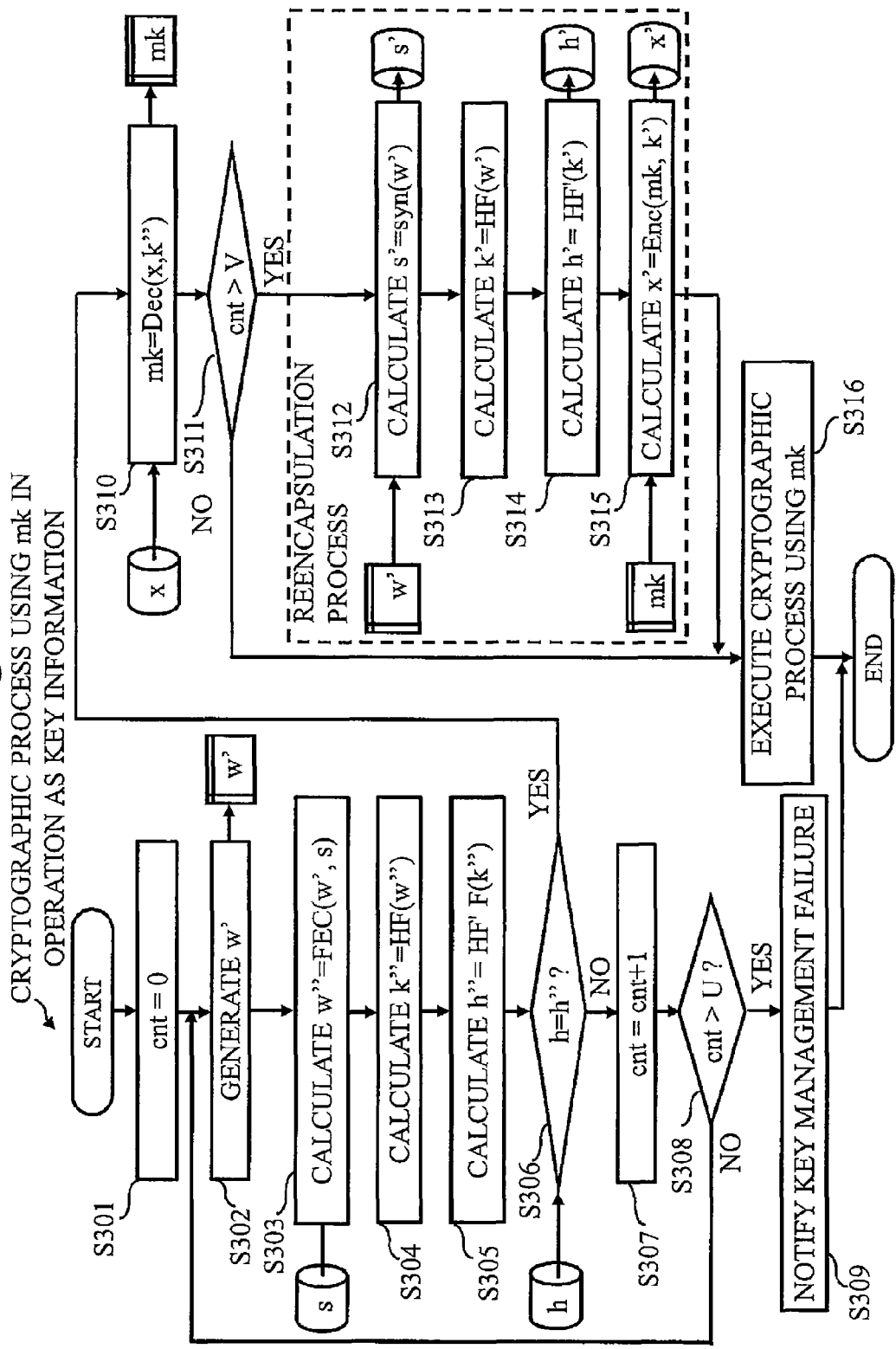
[FIG. 3] is a flowchart of an operation of the security device 101 according to Embodiment 1.

FIG. 3 is a flowchart that explains how the security device 101 works in the operation (regeneration).

(1) When the security device 101 in operation receives an encryption process request or decryption process request that uses the confidential information mk, the key managing circuit 150-1 is activated first. The error count monitor 156-1 resets an internal counter cnt incorporated in it (S301).

(2) Upon this activation, the PUF 151 generates (regenerates) an identifier w' (S302). At this time, note that the identifier w' does not always coincide with the identifier w generated in the initial setting and that the identifier w' is a bit string including noise, as compared to the identifier w.

(3) Then, using the identifier w' and the auxiliary data s which is stored in the nonvolatile memory 120, the FEC 152 calculates $$w''=FEC(w',s)$$

which is an error correcting process for the identifier w' (S303). At this time, note that w''=w if the identifier w' falls within the range of the correction capability of the error FEC 152.

(4) The hash function HF 153 converts the identifier w'' that has been error-correction-processed, into key information k'' by randomization (regeneration of the key information) (S304).

(5) The HF' 154 calculates a hash value h" of the key information k" (regeneration of the hash value), and sends the hash value h" to the comparator 155 (S305).

(6) The comparator 155 compares the hash value h" with the authentication code h of the confidential information k (key information k) stored in the nonvolatile memory 120 to check whether they coincide or not (S306). If they coincide, the comparator 155 sends the key information k" to the cryptographic coprocessor 160.

If w"=w, then h=h" and k=k".

If h=h" in spite of w"!=w (w" and w' do not coincide), this signifies collision in the unidirectional hash function. Usually, this occurs with a probability of as very low as $2^{-128}$.

(7) Then, the cryptographic coprocessor 160 performs a decryption process using the encrypted confidential information x stored in the nonvolatile memory 120 and the key information k" regenerated by the hash function HF 153, thus obtaining mk=Dec(x, k") (S310).

(8) In the case of noncoincidence in S306, the error count monitor 156-1 receives a noncoincidence notice from the comparator 155 and increments the internal counter cnt (S307).

(9) After that, the error count monitor 156-1 checks whether the internal counter cnt exceeds a reencapsulation threshold U (S308). Until the internal counter cnt exceeds the threshold U, the process restarts with S302, and a series of processes until S308 are executed. If the internal counter cnt exceeds the threshold U, the error count monitor 156-1 notifies a key management failure to the CPU 110. The process is stopped (S309).

(10) When the normal process is successful, S310 is executed, and after that the error count monitor 156-1 checks the internal counter cnt to see whether the internal counter cnt exceeds a reencapsulation threshold V (second threshold) (a predetermined stability checking rule) (S311). The threshold V is a value equal to or less than the threshold U of S308. If the internal counter cnt exceeds the reencapsulation threshold V, the process proceeds to S312, and the reencapsulation process to be described hereinafter is conducted. In the reencapsulation process, the error count monitor 156-1 causes the FEC 152, the HF 153, the HF' 154, and the cryptographic coprocessor 160 to perform the following process.

In the reencapsulation process, in S312, the FEC 152 generates updating auxiliary data corresponding to the identifier w' regenerated in S302, from s'=syn(w').

In S313, the HF 153 generates confidential information k' corresponding to the identifier w' as input, from k'=HF(w')

In S314, the HF' 154 generates an authentication code h' (hash value) for the key information k', from h'=HF'(k')

In S315, the cryptographic coprocessor 160 encrypts the confidential information mk decrypted in S310, by x'=Enc(mk,k')

as updating information using the key information k' generated in S313. The error count monitor 156-1 updates (s, h, x) stored in the nonvolatile memory 120 to (s', h', x').

At this time, during updating, write into the nonvolatile memory 120 may fail for some reason. Considering this, it is desirable to manage at least two-generation sets (s, h, x) by the nonvolatile memory 120 and operate them, instead of overwriting (s, h, x) with (s', h', x').

If the internal counter cnt of the error count monitor 156-1 does not exceed the threshold V, the process proceeds to S316, and the cryptographic coprocessor 160 executes "the encryption process or the decryption process" using the confidential information mk. In terms of the security, it is desirable to clear the confidential information mk from the register after execution of S309. If the processing capability is limited, however, the confidential information mk may be held in the register. The confidential information mk may be deleted from the register in response to an external clear request to the cryptographic coprocessor 160. Until the confidential information mk is cleared, encryption and decryption process using the confidential information mk may be executed. In either case, the confidential information mk is deleted when the power supply of the security device is cut off.

In the above process, the confidential information mk is encrypted by the volatile confidential information k generated by the processes of the PUF 151, FEC 152, and HF 153. The encrypted confidential information mk is stored in the nonvolatile memory 120, so that the confidential information mk is securely managed by the security device 101. The failure frequency of the generation of the confidential information k due to temporal changes is detected. When the failure frequency increases, the confidential information ink is reencapsulated by key information k' newly generated in the current operating environment, and stored in the nonvolatile memory. Since this reduces the temporal changes of the new key information k' with respect to the original key information k, the failure frequency of the generation of the key information k can be further decreased. In this manner, as the volatile confidential information k is updated as required considering the temporal changes, decryption of mk can be guaranteed over a long period of time without including a margin in the correction capability of the FEC.

According to the above scheme, the confidential information mk exists in the register only during the operation. Where the power supply is cut off, only the encrypted confidential information x which is encrypted by the key information k exists in the nonvolatile area. Hence, the key information k and the confidential information mk cannot be restored by static analysis through chip destruction. Hence, the confidential information mk can be managed more securely than in a case of storing it in the nonvolatile area directly.

Furthermore, the assignment of the confidential information mk can be controlled according to the use. For example, for a certain product line, the assignment of mk may be changed according to the product type or shipping destination, while for another certain product line, the assignment of mk may be changed according to the security device. In addition, the confidential information mk may be key information in common key cryptography, or a secret key in public key cryptography.

Embodiment 2

A security device 102 according to Embodiment 2 will be described with reference to FIGS. 4 and 5.

Figure 4:
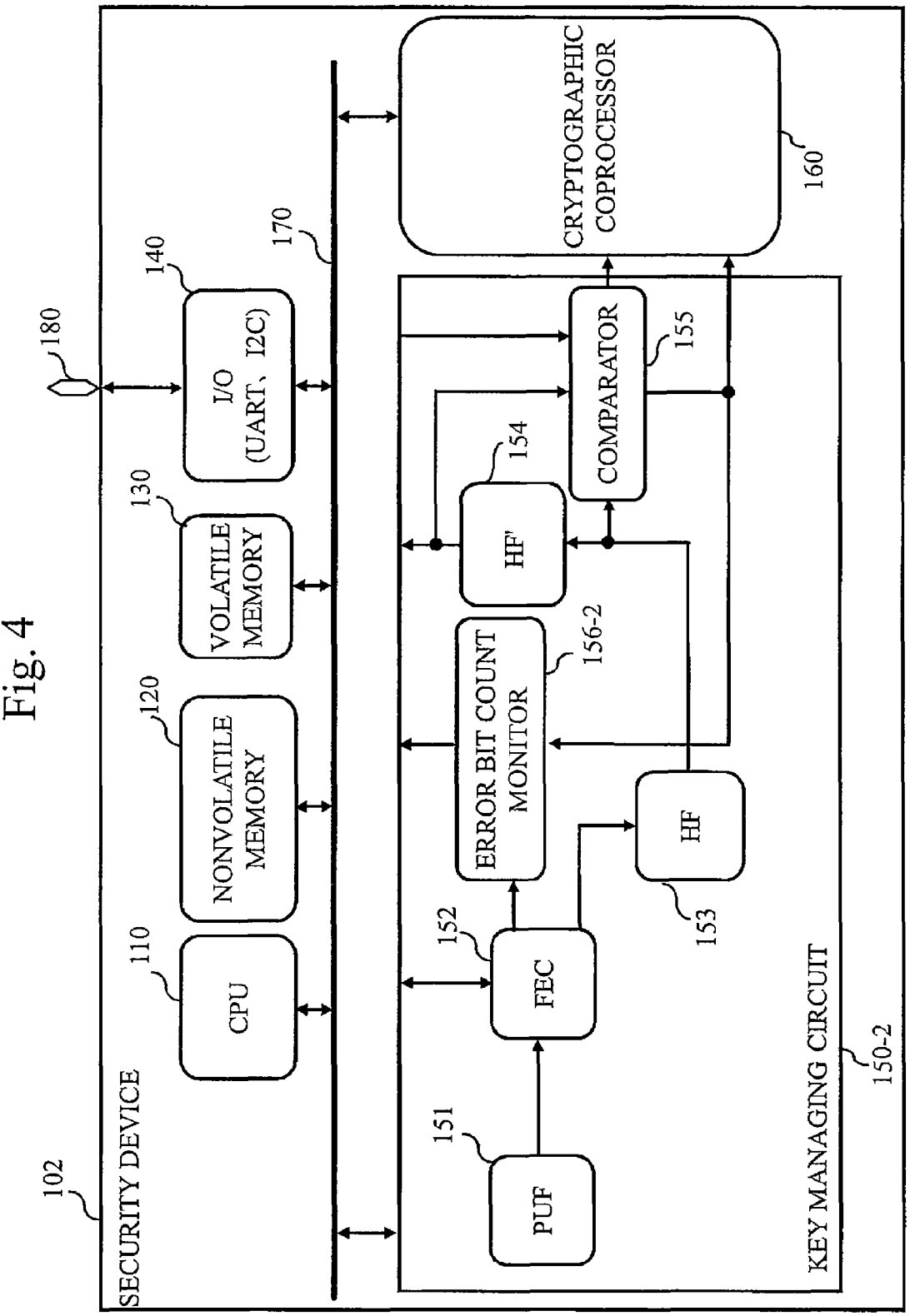
[FIG. 4] is a configuration diagram of a security device 102 according to Embodiment 2.

FIG. 4 is a block diagram of the security device 102. In the security device 102, a key managing circuit 150-2 replaces the key managing circuit 150-1. The difference between the key managing circuit 150-1 and the key managing circuit 150-2 resides in that in the key managing circuit 150-2, an error bit count monitor 156-2 (monitoring part) replaces the error count monitor 156-1.

Unlike the error count monitor 156-1, the error bit count monitor 156-2 checks whether or not execution of the reencapsulation process is needed based on the error bit count of the identifier w', instead of checking based on the count of noncoincidences with the authentication code h (S311).

Figure 5:
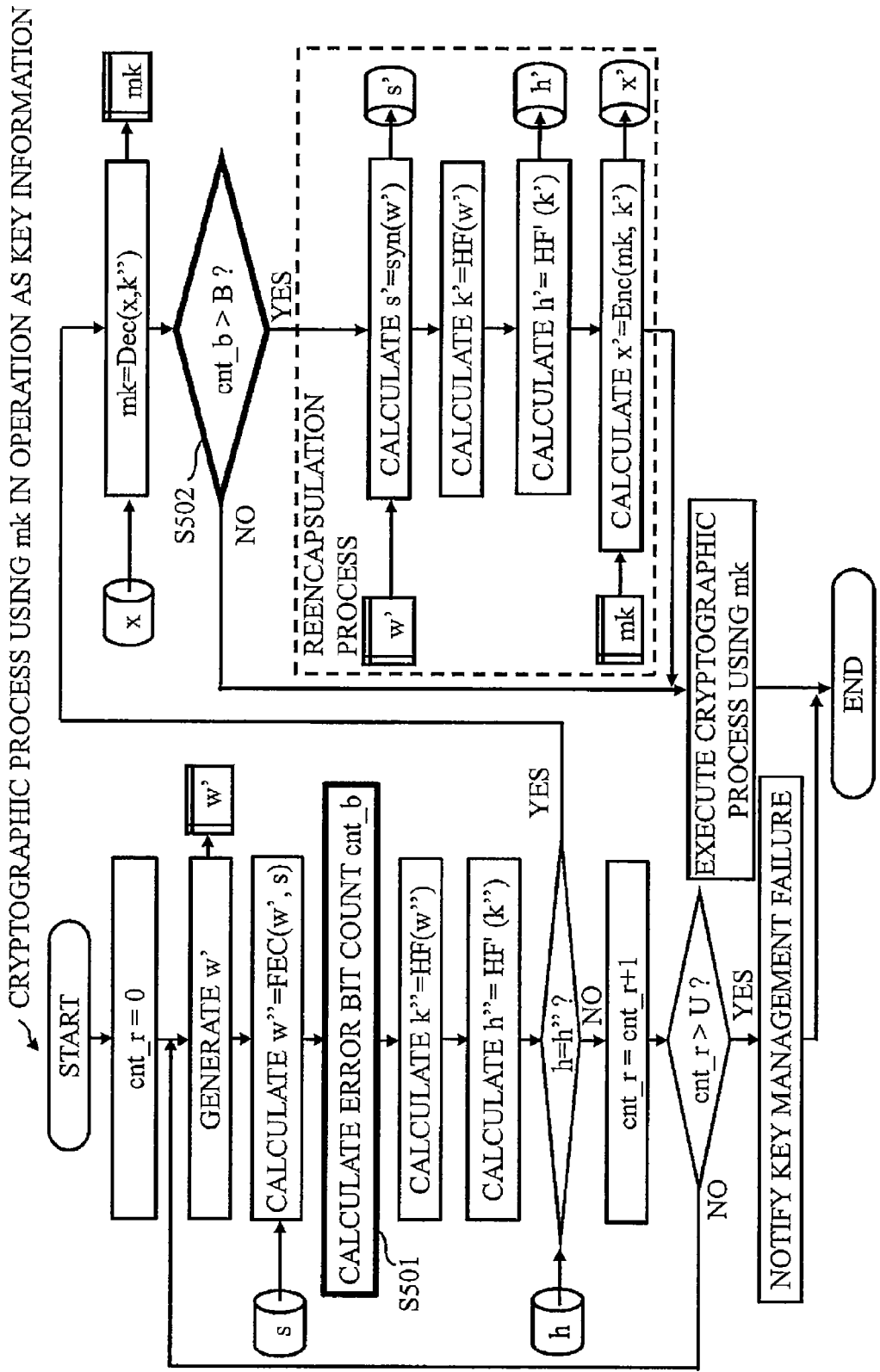
[FIG. 5] is a flowchart of an operation of the security device 102 according to Embodiment 2.

FIG. 5 is a flowchart that explains how the security device 102 works in the operation (regeneration). The basic process flow is the same as that in FIG. 3, but the process of S501 and 5502 is different from that of FIG. 3.

(1) In S501, the error bit count monitor 156-2 counts error bits based on an error locator calculated in the process of the error correction process FEC 152. The obtained count value will be expressed as cnt_b.

(2) In S502, the error bit count monitor 156-2 compares "cnt_b" with a reencapsulation threshold B to check whether or not the count value "cnt_b" exceeds the threshold B (predetermined stability checking rule). If the count value "cnt_b" exceeds the threshold B, the error bit count monitor 156-2 causes the FEC 152, the HF 153, the HF' 154, and the cryptographic coprocessor 160 to perform a reencapsulation process, in the same manner as in Embodiment 1.

Embodiment 1 and Embodiment 2 will be compared hereinafter. Note that the comparison will be made referring to a case that uses an error correction code having a minimum distance of 21. In this case, the correctable bit count is 10 at a maximum. In Embodiment 1, if the identifier w' includes more than 10 error bits and the key generation failure frequency increases, the reencapsulation process is executed. In Embodiment 2, key generation will not fail if B=7, but the failure possibility increases. More specifically, the reencapsulation process is executed even when the identifier w' includes 7 to 10 error bits.

Embodiments 1 and 2 describe that the authentication code is generated for the confidential information k obtained by converting the device identifier w. A similar function can be achieved with the pre-conversion device identifier w.

In the above description, the authentication code (hash value) for the key information is generated. More specifically, the key information is the target for which the authentication code (unidirectional hash value) is to be generated (predetermined hash value generation rule). However, the present invention is not limited to this, but the hash value generation rule may determine an identifier as a target for which an authentication code is to be generated. Alternatively, "data obtained by connecting the key information k and the encrypted confidential information x", or "data obtained by connecting the identifier w and the encrypted confidential information x" may be determined as a target for which an authentication code is to be generated. This enables detecting tampering of the encrypted confidential information x.

Embodiment 1 or 2 may be chosen properly depending on the trade-off with the processing time, the restriction on the nonvolatile memory rewriting count, and the like.

Lastly, the methods described in Embodiments 1 and 2 are not limited to Embodiments 1 and 2 precisely. That is, in the implementation phase, Embodiments 1 and 2 can be practiced by modifying the constituent elements within a range not departing from the gist of the invention. Also, various types of inventions may be made by appropriately combining a plurality of constituent elements disclosed in the above embodiments. In addition, some of the constituent elements may be eliminated from the entire constituent elements described in the embodiments. Furthermore, constituent elements that cover different embodiments may be combined appropriately.

In the above embodiments, a security device has been described. It is also possible to comprehend the operation of the security device as a key information generating method.

In the above embodiments, a security device has been described which is provided with a method for encrypting the externally supplied confidential information mk assigned to the device, utilizing the device key k obtained by converting the device identifier generated according to the physical properties.

In the above embodiments, a security device has been described which is provided with a method for checking whether a device identifier according to the physical properties is generated correctly, by referring to a hash value.

In the above embodiments, a security device has been described which is provided with a function of checking whether or not a device identifier to be generated according to the physical properties is generated correctly, by referring to a hash value, and counting the failures, and a function of notifying that generation of the device identifier fails when the failure count exceeds a threshold.

In the above embodiments, a security device has been described which is provided with a function of checking whether or not a device identifier to be generated according to the physical properties is generated correctly, by referring to a hash value, and counting the failures, and a function of executing generation of a new device identifier, in the case of successful device identifier generation, when the failure count till the success exceeds a threshold.

In the above embodiments, a security device has been described which is provided with a method for calculating a hash value in case of generating a new device identifier, thereby updating the last hash value.

In the above embodiments, a security device has been described which is provided with a method for checking, from an error bit count, the possibility of incorrectly generating a device identifier which is to be generated according to the physical properties, and if the error bit count exceeds a threshold, executing generation of a new device identifier.

In the above embodiments, a security device has been described which is provided with a method for storing an encryption result of the confidential information mk, in the nonvolatile memory.

In the above embodiments, a security device has been described which is provided with a method for encrypting the confidential information mk assigned to the device, and detecting tampering of data stored in the nonvolatile memory.

REFERENCE SIGNS LIST 101, 102: security device; 110: CPU; 120: nonvolatile memory; 130: volatile memory; 140: I/O; 150-1, 150-2: key managing circuit; 151: PUF; 152: FEC; 153: HF; 154: HP; 155: comparator; 156-1; error count monitor; 156-2: error bit count monitor; 160: cryptographic coprocessor; 170: local bus; 180: external port

The invention claimed is:
1. A key information generation device for generating key information, comprising:
  processing circuitry configured to:
    generate, based on physical properties of the key information generation device, an identifier specific to the key information generation device;
    generate, based on the identifier, the key information to be used for encrypting and decrypting confidential information;
    encrypt and decrypt the confidential information using the key information;
    generate a hash value based on the key information, after the key information is generated, and in accordance with a hash value generating scheme that uses at least the key information;
    store encrypted confidential information and the hash value in a nonvolatile manner, the encrypted confidential information being formed by encrypting the confidential information using the key information, the hash value being generated in accordance with the hash value generating scheme that uses at least the key information used for encrypting the confidential information;

regenerate the identifier when the confidential information is decrypted;

regenerate the key information based on the regenerated identifier for decrypting the encrypted confidential information;

regenerate the hash value in accordance with the hash value generating scheme that uses at least the key information;

compare the regenerated hash value and the stored hash value;

decrypt the encrypted confidential information, when the regenerated hash value and the stored hash value are equal, using the regenerated key information;

execute a series of processes including regenerating the identifier, regenerating the key information, and regenerating the hash value; and execute a comparing process including repeatedly comparing the regenerated hash value and the stored hash value within a range where a repetition count does not exceed a threshold count U, until the regenerated hash value is equal to the stored hash value.

2. The key information generation device according to claim 1, the processing circuitry is further configured to:

when the regenerated hash value is equal to the stored hash value within the range where the repetition count of the series of processes does not exceed the threshold count U, decrypt the encrypted confidential information using the regenerated key information which serves as a basis of regeneration of the regenerated hash value;

when the regenerated hash value is equal to the stored hash value within the range where the repetition count of the series of processes does not exceed the threshold count U, check whether or not the regenerated identifier which serves as a basis of regeneration of the key information serving as the basis of regeneration of the hash value being equal to the stored hash value is stably regenerated, based on a stability checking rule; and if it is determined that the identifier is not regenerated stably:

generate the key information from the regenerated identifier which serves as the basis of regeneration of the key information serving as the basis of regeneration of the hash value being equal to the stored hash value, generate an updating hash value in accordance with the hash value generating scheme that uses at least the generated key information, encrypt the decrypted confidential information, as the encrypted confidential information for updating, using the generated key information, and update the stored hash value and the stored encrypted confidential information, respectively, with the hash value for updating and the encrypted confidential information for updating.

3. The key information generation device according to claim 2, wherein the processing circuitry is further configured to check, using the stability checking rule, whether or not the repetition count of the series of processes exceeds a second threshold count V, which is a count equal to or smaller than the threshold count U, and if the repetition count of the series of processes exceeds the second threshold count V, determines that the identifier is not regenerated stably.

4. The key information generation device according to claim 2, wherein the processing circuitry is further configured to:

execute, in the series of processes, an error correcting process on the regenerated identifier, regenerate, in the series of processes, the key information from the error-corrected identifier, when the hash value that is equal to the stored hash value is regenerated within the range where the repetition count of the series of processes does not exceed the threshold count U, decrypt the encrypted confidential information, using the key information which serves as the basis of regeneration of the same regenerated hash value and which is regenerated from the error-corrected identifier, and obtain, in the series of processes, an error bit count resulted from the error correction process, and when the hash value that is equal to the stored hash value is regenerated within the range where the repetition count of the series of processes does not exceed the threshold count U, checks, as the stability checking rule, whether or not the error bit count exceeds a threshold count B, and if the error bit count exceeds the threshold count B, determine that the identifier is not regenerated stably.

5. The key information generation device according to claim 1, wherein the processing circuitry is further configured to determine that regeneration of the key information fails when the repetition count of the series of processes exceeds the threshold count U.

6. The key information generation device according to claim 1, wherein the processing circuitry is further configured to:

employ, as the hash value generating scheme, either one of a hash value of the generated key information, and a hash value of data formed by connecting the generated key information and the encrypted confidential information.

7. A method for generating key information comprising:

generating, via circuitry of a key information generation device, based on physical properties of the key information generation device, an identifier specific to the key information generation device;

generating, via the circuitry, based on the identifier the key information to be used for encrypting and decrypting confidential information;

encrypting and decrypting, via the circuitry, the confidential information using the key information;

generating, via the circuitry, a hash value based on the key information, after the key information is generated, and in accordance with a hash value generating scheme that uses at least the key information;

storing, via the circuitry, encrypted confidential information and the hash value in a nonvolatile manner, the encrypted confidential information being formed by encrypting the confidential information using the key information, the hash value being generated in accordance with the hash value generating scheme that uses at least the key information used for encrypting the confidential information;

regenerating, via the circuitry, the identifier when the confidential information is decrypted;

regenerating, via the circuitry, the key information based on the regenerated identifier for decrypting the encrypted confidential information;

regenerating, via the circuitry, the hash value in accordance with the hash value generating scheme that uses at least the key information;

comparing, via the circuitry, the regenerated hash value and the stored hash value; and decrypting, via the circuitry, the encrypted confidential information, when the regenerated hash value and the stored hash value are equal using the regenerated key information;

executing, via the circuitry, a series of processes including regenerating the identifier, regenerating the key information, and regenerating the hash value; and executing, via the circuitry, a comparing process including repeatedly comparing the regenerated hash value and the stored hash value within a range where a repetition count does not exceed a threshold count U, until the regenerated hash value is equal to the stored hash value.

8. The method according to claim 7, further comprising:

when the regenerated hash value is equal to the stored hash value within the range where the repetition count of the series of processes does not exceed the threshold count U, decrypting, via the circuitry, the encrypted confidential information using the regenerated key information which serves as a basis of regeneration of the regenerated hash value;

when the regenerated hash value is equal to the stored hash value within the range where the repetition count of the series of processes does not exceed the threshold count U, checking, via the circuitry, whether or not the regenerated identifier which serves as the basis of regeneration of the key information serving as the basis of regeneration of the hash value being equal to the stored hash value is stably regenerated, based on a stability checking rule; and if it is determined that the identifier is not regenerated stably:

generating, via the circuitry, the key information from the regenerated identifier which serves as the basis of regeneration of the key information serving as the basis of regeneration of the hash value being equal to the stored hash value, generating, via the circuitry, an updating hash value from the generated key information, encrypting, via the circuitry, the decrypted confidential information, as the encrypted confidential information for updating, using the generated key information, and updating, via the circuitry, the stored hash value and the stored encrypted confidential information, respectively, with the hash value for updating and the encrypted confidential information for updating.

\* \* \* \* \*